Oct. 28, 1958 V. M. MESERVE ET AL 2,858,426
ELECTRONIC PULSE GENERATOR
Filed Dec. 22, 1952 7 Sheets-Sheet 1

INVENTORS V. M. MESERVE
O. R. MILLER
BY R. O. Covell
ATTORNEY

Oct. 28, 1958 V. M. MESERVE ET AL 2,858,426

ELECTRONIC PULSE GENERATOR

Filed Dec. 22, 1952 7 Sheets-Sheet 2

INVENTORS V. M. MESERVE
O. R. MILLER
BY
R. O. Covell
ATTORNEY

Oct. 28, 1958 V. M. MESERVE ET AL 2,858,426

ELECTRONIC PULSE GENERATOR

Filed Dec. 22, 1952 7 Sheets-Sheet 3

INVENTORS V. M. MESERVE
O. R. MILLER
BY R. O. Covell
ATTORNEY

INVENTORS V. M. MESERVE
O. R. MILLER
BY
R. O. Covell
ATTORNEY

ELECTRONIC PULSE GENERATOR

Filed Dec. 22, 1952 7 Sheets-Sheet 5

INVENTORS V. M. MESERVE
O. R. MILLER
BY
R. O. Covell
ATTORNEY

INVENTORS V. M. MESERVE
O. R. MILLER
BY
R. O. Covell
ATTORNEY

Oct. 28, 1958 V. M. MESERVE ET AL 2,858,426

ELECTRONIC PULSE GENERATOR

Filed Dec. 22, 1952 7 Sheets-Sheet 7

INVENTORS V. M. MESERVE
O. R. MILLER
BY
R. D. Covell
ATTORNEY

United States Patent Office 2,858,426

Patented Oct. 28, 1958

2,858,426

ELECTRONIC PULSE GENERATOR

Vincent M. Meserve, Orange, and Ohmer R. Miller, Morristown, N. J., assignors to Bell Telephone Laboratories, Incorporated, New York, N. Y., a corporation of New York Application December 22, 1952, Serial No. 327,184

24 Claims. (Cl. 250—27)

This invention relates to electrical pulse generators.

An object of this invention is the generation of pulses of precise shape, amplitude, duration and frequency.

Another object of this invention is the generation of trains of electrical pulses, each train comprising a precisely selectable number of pulses.

A further object of this invention is the generation of a plurality of trains of electrical pulses with a precisely selectable delay interval between trains.

A feature of this invention is a time-base circuit which produces a linearly rising voltage.

Another feature of this invention is a discharging circuit which precisely and abruptly restores a linearly rising voltage to its initial condition.

Another feature of this invention is an improved means for actuating control equipment after a precisely selectable number of input pulses have been received.

Another feature of this invention is an improved means for terminating the generation of pulses after a precisely selectable number of those pulses have been generated.

Another feature of this invention is an improved means for interrupting the operation of a pulse generator for a precisely selectable interval of time.

Another feature of this invention is a potentiometer for controlling the bias on a tube and an additional potentiometer, mechanically ganged to the control potentiometer, for compensating for any non-linearity of the control potentiometer and for the effect of small impedance changes resulting from changes in the setting of the control potentiometer.

The manner in which the above-listed and other objects of this invention are accomplished, and the nature of the above-listed and other features of the invention, may be understood from the following description of a preferred embodiment of the invention when read with reference to the accompanying drawings in which.

Figure 1:
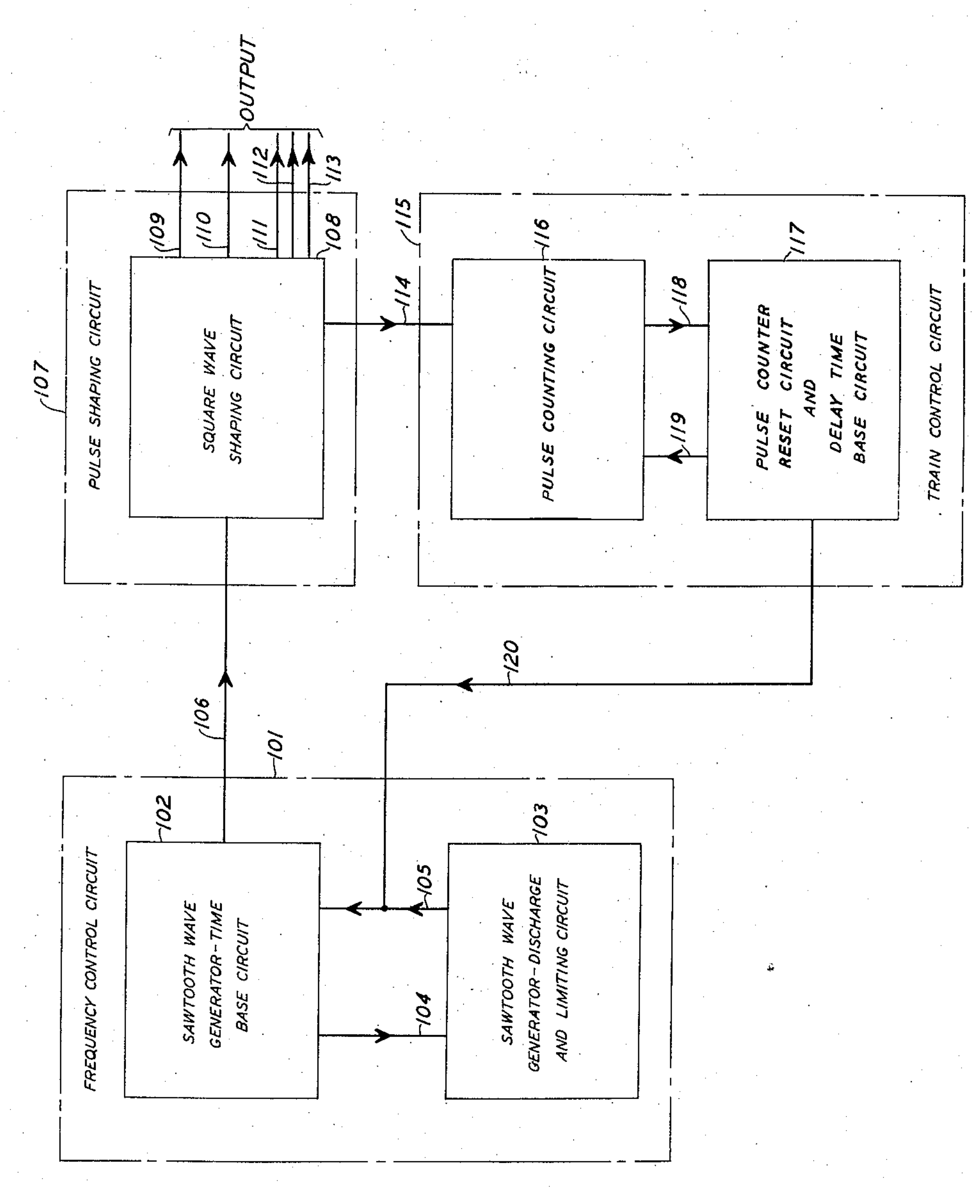
Fig. 1 is a block schematic representation of the major elements of the preferred embodiment of the invention.

Referring first to the block schematic representation of Fig. 1, block 101 represents the frequency control circuit which functions to generate a saw-tooth wave. The frequency control circuit comprises a time-base circuit 102 (shown in detail in Fig. 2 of the drawings), which produces a linearly increasing voltage, and a discharge and limiting circuit 103 (shown in detail in Fig. 3 of the drawings), which responds to the linearly increasing voltage applied to it by conductor 104 abruptly to discharge, via conductor 105, the time-base circuit of block 102, whereby the aforesaid linearly rising voltage is sharply reduced to its initial value. The operation is repetitive so that a saw-tooth wave is applied to output conductor 106 of the frequency control circuit 101. This series of saw-tooth pulses on conductor 106 is applied to the pulse shaping circuit 107 which comprises a square wave shaping circuit 108, shown in detail in Fig. 4 of the drawings. The output of this circuit includes a series of positive-going square wave pulses applied to conductor 109 and a series of negative-going square wave pulses applied to conductor 110. The circuit also functions periodically to connect conductor 111 alternately to conductors 112 and 113.

Figure 5:
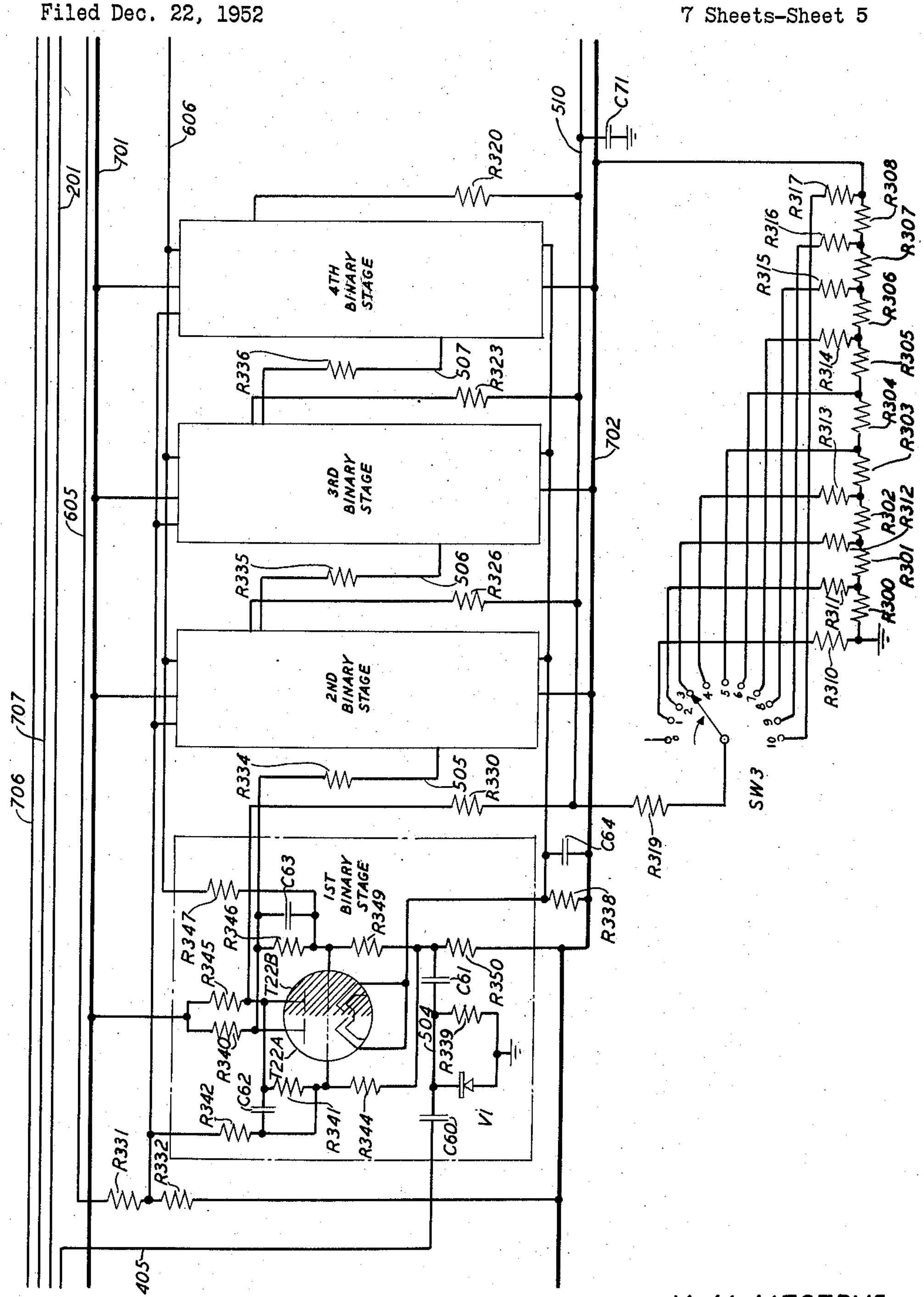
Fig. 5 shows the pulse counting circuit.
Figure 6:
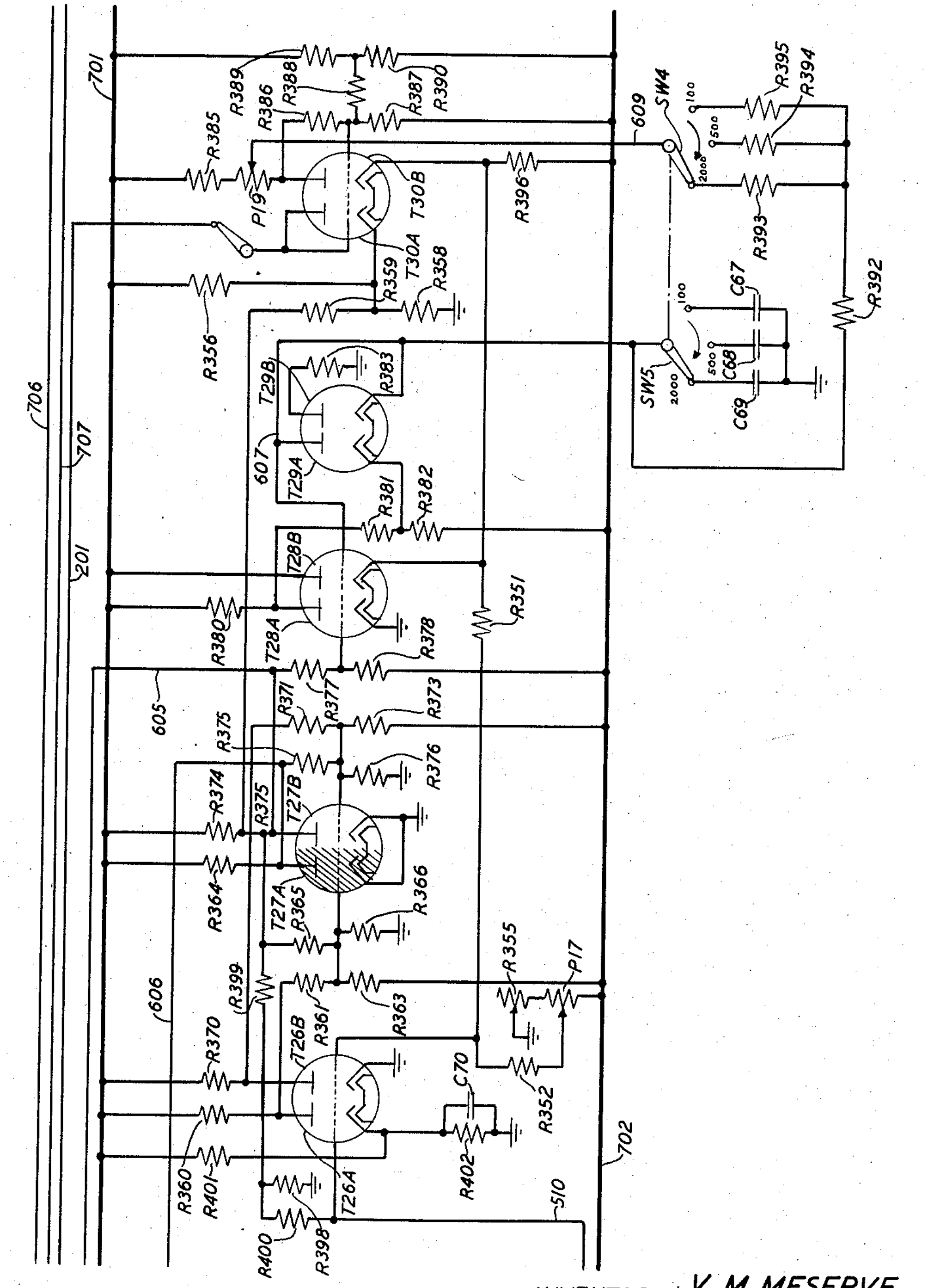
Fig. 6 shows the pulse counter discharge circuit and the delay time-base circuit.

The pulse shaping circuit 107 also applies a series of square wave pulses via conductor 114 to the train control circuit 115 which comprises a pulse counting circuit 116 (shown in detail in Fig. 5 of the drawings), and a pulse counter reset circuit and delay time-base circuit 117 (shown in detail in Fig. 6 of the drawings). The pulse counting circuit 116 counts the pulses on conductor 114 and transmits a signal to the pulse counter reset circuit and delay time-base circuit 117 via conductor 118 when a preselected number of those pulses have been counted. The circuits 117, in response to this signal, transmit a resetting signal to the pulse counting circuit 116 via conductor 119 and establish a condition in a circuit including conductor 120 whereby the saw-tooth wave generator time-base circuit 102 is disabled to function, whereupon the square wave shaping circuit 108 also ceases operating. After a preselectable time interval, the delay time-base circuit 117 establishes a condition in a circuit including conductor 120 whereby the time-base circuit 102 is again enabled, whereupon the square wave shaping circuit 108 will again function.

Consequently, the apparatus is capable of producing precisely shaped wave forms at a precise and selectable frequency, of producing trains of pulses comprising a precise and selectable number of those wave forms, and of providing a precise and selectable delay between pulse trains.

The details of the above-discussed circuits and of a suitable power supply circuit will be described with reference to Figs. 2 to 7 of the drawings.

*Linear time base circuit*

In electrical systems, integration may be accomplished by using a resistance-capacitance network wherein the current through a resistor R, resulting from the voltage signal to be integrated, V, is summed in a capacitor C. The voltage V1 across capacitor C at any time $t$ is $$V1=\frac{1}{RC}\int_{t_0}^{t_1} Vdt$$

provided that the current through resistor R is always equal to $V/R$. This ideal linearity has generally been achieved in prior electronic systems by utilizing an ungrounded capacitor and high-gain tubes. However, in such systems, a broad-band amplifier is required if high-speed clamping or reset is required on low frequency measuring circuits, and this increases the difficulties encountered with high gain. Additionally, since the output side of the capacitor is normally terminated in a low-impedance circuit, the amplifier tends to resist any voltage change at the input side of the capacitor by causing the voltage at the output side of that capacitor to change oppositely, thereby making reset and clamping at a specified value exceedingly difficult. To reduce these difficulties, a circuit wherein one side of the changing capacitor is grounded is utilized.

Figure 2:
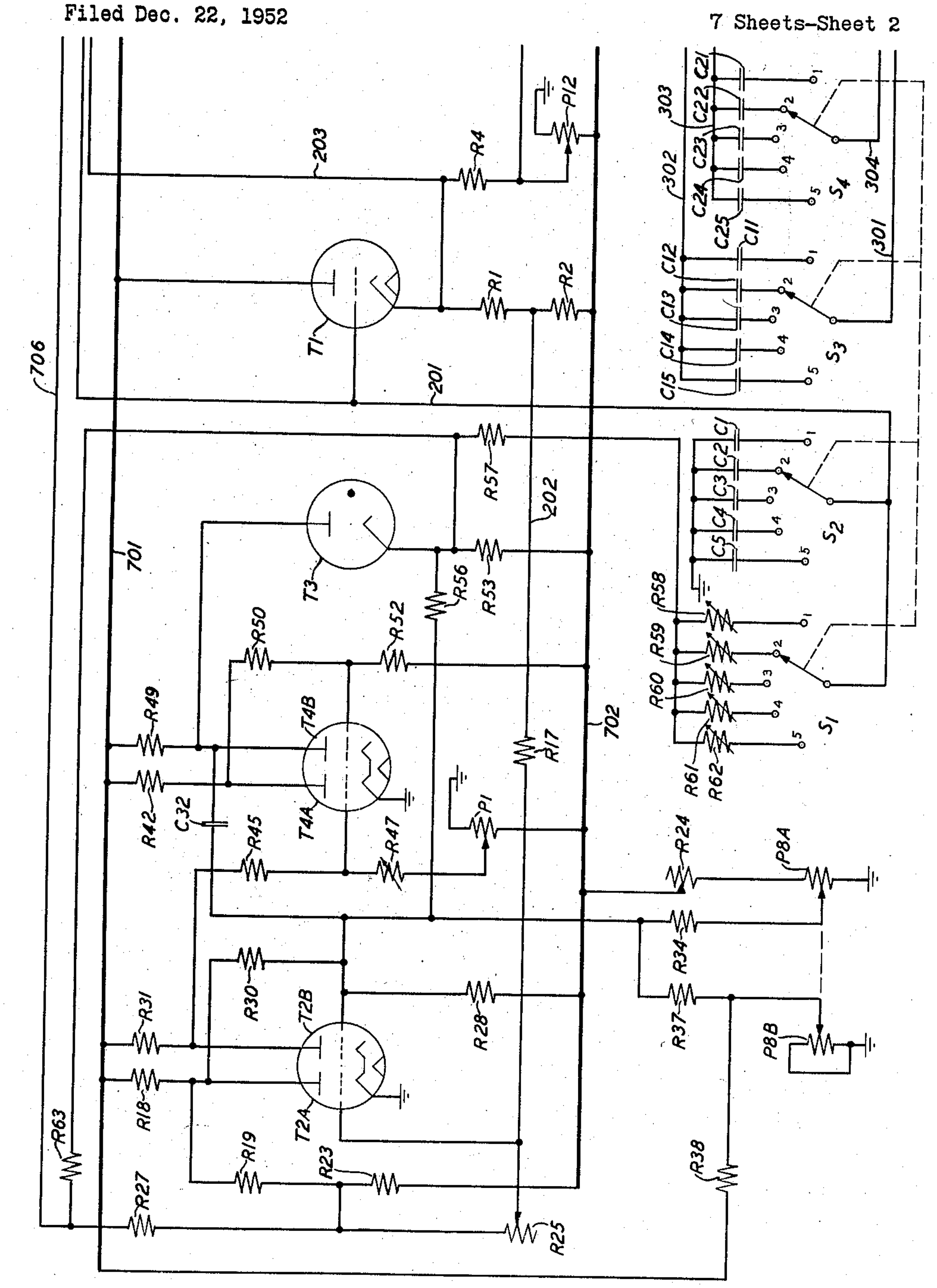
Fig. 2 shows the details of the time-base circuit for the saw-tooth wave generator.

Referring now to Fig. 2 of the drawings, conductor 701 is supplied with a positive voltage of, for example, 210 volts, and conductor 702 is supplied with a negative voltage of, for example, a negative 105 volts by the power supply circuit shown in Fig. 7, the operation of which will be described hereinafter. A gas-filled voltage-regulator diode T3 is inserted, in series with resistors R53 and R49, across the positive and negative sources of potential on conductors 701 and 702, respectively. Tube T3 and the values of resistors R53 and R49 are so chosen that the normal potential at the cathode of tube T3 remains positive.

This positive voltage at the cathode of voltage-regulator diode T3 is utilized linearly to charge a selected one of the grounded capacitors C1 to C5 (assumed to be capacitor C2) over an impedance path including resistor R57 and a selected one of the resistors R58 to R62 (assumed to be resistor R59). Since the ungrounded side of the selected capacitor C2 is initially at essentially ground potential, as will be explained hereinafter, the charging path for capacitor C2 may be traced from the positive potential at the cathode of the voltage regulator T3, and resistors R57 and R59, terminal No. 2 of switch S1, terminal No. 2 of switch S2, capacitor C2, to ground.

As was above noted, if optimum linearity of capacitor charge is to be achieved, the current in the above-traced resistance-capacitance network must be maintained as nearly constant as is practicable by maintaining a constant voltage drop across resistor R57 and the selected resistor R59. This may be accomplished by causing the potential at the cathode of tube T3 to rise at the same rate as the potential across capacitor C2 increases. This is attained in the present invention by utilizing an amplifier circuit comprising tubes T1, T2A, T2B, T4A and T4B.

The rising potential at the positive plate of capacitor C2 is applied via conductor 201 to the control grid of triode T1. The current through tube T1 will therefore be increased, resulting in the development of an increasing potential drop across cathode resistors R1 and R2. The potential at a point intermediate resistors R1 and R2 is applied via conductor 202 and resistor R17 to the control grid of triode T2A. The application of this rising potential to triode T2A causes an increase of current therethrough with a resultant reduction in potential at the anode of tube T2A due to the increased potential drop across load resistor R18. The output potential at the anode of tube T2A is coupled to the grid of tube T2B by resistor R30, thereby forming one input to the three-stage high-gain summing amplifier comprising triodes T2B, T4A and T4B. The incoming signal is inverted and amplified by tube T2B, the resultant rising potential at the anode thereof being applied through resistor R45 to the grid of triode T4A, the bias on tube T4A being controlled by means of variable resistor R47 and variable voltage divider P1. Tube T4A inverts and amplifies the incoming signal and the resulting output is applied through resistor R50 to the grid of tube T4B, the bias on tube T4B being controlled by means of resistor R52. The output of this final stage of the three-stage amplifier is coupled by means of diode T3 to the input, at the cathode of tube T3, of the resistance-capacitance charging path (resistors R57 and R59 and capaictor C2).

To reduce the gain and to increase the direct-current stability of the amplifiers, thereby to improve the linearity of the final output, negative feedback is employed both in the single-stage amplifier T2A and in the three-stage amplifier comprising tubes T2B, T4A and T4B. The feedback path for the single-stage amplifier may be traced from the anode of tube T2A, resistor R19, adjustable resistor R25, to the grid of tube T2A. The feedback path for the three-stage amplifier may be traced from the anode of tube T4B, diode T3, resistor R56, to the grid of tube T2B. Capacitor C32 may be inserted between the anode of tube T4B and the grid of tube T2B to prevent oscillation of the amplifying circuit.

Since the rising potential on capacitor C2 is inverted four times (by tubes T2A, T2B, T4A and T4B, tube T1 being a cathode follower) the output signal at the anode of the final stage T4B will also be a rising potential. The parameters both of the feedback circuits and of the coupling networks are so chosen that the potential at the anode of tube T4B will increase at the same rate as the potential across capacitor C2 is increasing, thereby maintaining a constant potential drop across resistors R57 and R59 so that the charging current through capacitor C2 will be constant. The absolute linearity of this time-base circuit is limited only by the linearity of the amplifiers, which is of a high order due to the small net gain required and the use of negative feedback.

The rate at which a capacitor may be charged over an impedance path may be adjusted by varying either the value of the capacitor and the resistance of the charging path or the value of the applied voltage. The former method is employed herein to provide a plurality of ranges and the latter method is utilized to obtain precise adjustment within any selected range. As was hereinbefore noted, the charging path, including resistor R57, may be selected by means of mechanically linked switches S1 and S2 to comprise any one of the capacitors C1 to C5 with its associated resistor R58 to R62, respectively. Resistors R58 to R62 are considerably smaller in value than resistor R57 and are adjustable to provide a means for accurately adjusting the charging rates of the individual resistance-capacitance circuits.

The precise setting of the charging rate within any one of the several selectable ranges is controlled by adjusting the charging voltage. It will be recalled that one signal is applied from tube T2A to the input (the grid of tube T2B) of the three-stage amplifier and another voltage is applied to that input via the feedback path. A third source of controlling voltage is applied to this input to vary the bias of the first stage of the three-stage amplifier so as to vary the output voltage accordingly, and thereby to vary, in a controlled manner, the capacitor-charging voltage at the cathode of tube T3.

The grid of tube T2B is connected through resistor R34 to a variable voltage divider comprising ground, potentiometer P8A, variable resistor R24, and the negative potential on conductor 702. Since the charging rate of the selected capacitor varies directly with the change of this bias potential, a uniformly graduated dial may be used with the bias-control potentiometer P8A to indicate the saw-tooth wave frequency. Variable resistor R24, the wiper of which is connected to the negative potential on conductor 702, permits calibration of potentiometer P8A at the high end of its dial, and potentiometer P1, which controls the bias on tube T4A, permits calibration of potentiometer P8A at the low end of its dial.

Potentiometer P8B may be provided to compensate for non-linearity of potentiometer P8A and to compensate for the effect of small impedance changes resulting from the setting of potentiometer P8A. Both ends of the winding of potentiometer P8B are grounded. The brush of potentiometer P8B is connected electrically to a point intermediate resistors R37 and R38, resistor R38 being connected to the positive potential on conductor 701. The brush of potentiometer P8B is connected mechanically to the brush of potentiometer P8A. The value of resistor R38 is selected, preferably with both potentiometers P8A and P8B at their midpoints, so that the actual charging voltage at the cathode of tube T3 is proportionate to the setting of the dial of potentiometer P8A. Thereafter, as the brushes of potentiometers P8A and P8B are moved together, the output voltage of potentiometer P8B will tend to compensate for any non-linearity of the voltage output of potentiometer P8A.

*Discharge and limiting circuits*

Figure 3:
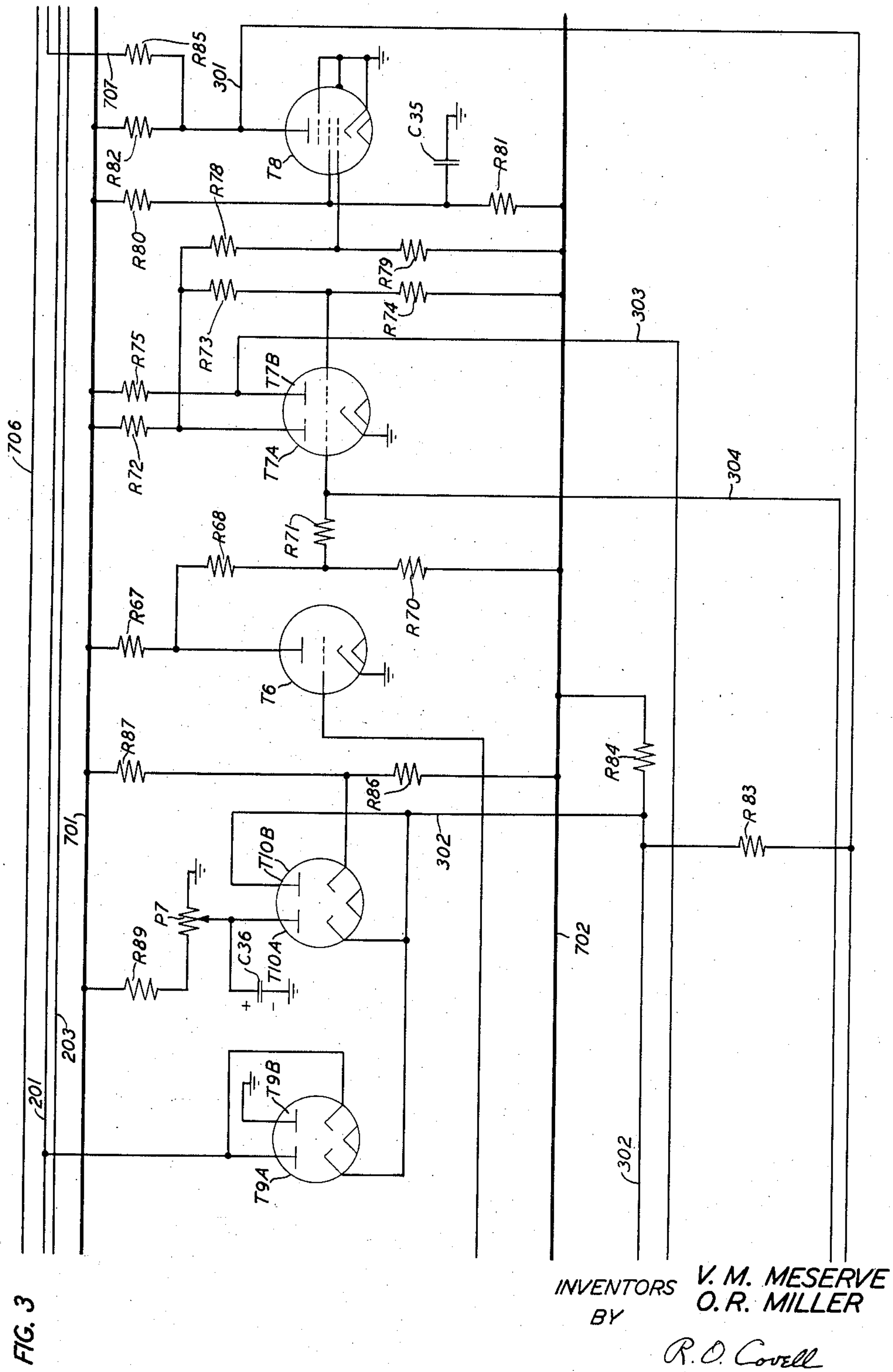
Fig. 3 shows the discharge and limiting circuits for the saw-tooth wave generator.

The apparatus thus far described produces a linear increase of potential across a capacitor, such as capacitor C2. In order to produce saw-tooth pulses of controlled frequency, additional means are provided to discharge that capacitor whenever the potential thereacross reaches a selected value. A circuit designed for this purpose is illustrated in Fig. 3.

The output potential of cathode follower T1, which is a function of the charge on capacitor C2, is coupled to the grid of triode T6 by means of the network comprising resistor R4 and potentiometer P12. Tube T6 is the first element of a three-stage amplifier including, additionally to tube T6, triode T7A and pentode T8. As will be noted hereinafter, tube T7B is used to provide positive feedback. The output of triode T6 is applied to the grid of tube T7A by means of the network comprising resistors R68, R70 and R71, and the output of tube T7A is applied to the control grid of pentode T8 by means of the network comprising resistors R78 and R79.

Prior to the time that a signal is applied to the control grid of tube T8, tube T8 is biased below cut-off. During this period, a circuit may be traced from the positive voltage on conductor 701, resistor R82, conductor 301, through resistor R83 and the selected one of the capacitors C11 to C15 (herein assumed to be capacitor C12) in parallel, and through resistor R84 to the negative voltage on conductor 702. The selected capacitor C12 will therefore become and normally be charged, with the upper electrode being negative with respect to the lower electrode. It may be noted that the upper electrode of the selected capacitor C12 is also connected directly to the anode of vacuum tube T10B and that the cathode of that tube is connected intermediate the voltage-divider resistors R86 and R87. Tube T10B thereby provides a low impedance path to expedite this charging of capacitor C12. The values of resistors R86 and R87 are selected to produce a potential on the upper plate of capacitor C12 above the maximum potential of capacitor C2.

When a sharp positive signal is applied to the control grid of pentode T8, the anode potential of that pentode drops sharply due to the potential drop across anode resistor R82, and this sharp drop in potential will be applied to the lower plate of the selected capacitor C12 via conductor 301. This sharp reduction in potential at the lower electrode of the selected capacitor C12 will instantaneously reduce the potential at the upper electrode of that capacitor by the same amount. This reduction in potential appears, via conductor 302, at the cathode of diode T9A, making that cathode substantially negative relative to the anode of diode T9A. Consequently, capacitor C2 will discharge over conductor 201 and through diode T9A, charging capacitor C12. This discharge of capacitor C2 terminates one saw-tooth pulse. Capacitor C2 will immediately commence linearly to recharge over the previously traced path to institute the generation of a second saw-tooth pulse and capacitor C12 will rapidly be recharged to its original condition in the manner hereinbefore described. It may be noted that capacitor C12 will start to recharge with a faster time constant than capacitor C2, preventing interference with the linear recharge of capacitor C2.

Diodes T9B and T10A perform certain control functions during the discharge of the selected capacitor C2. Capacitor C2 is connected, via conductor 201, to the cathode of diode T9B, the anode of which is grounded. Consequently, diode T9B limits the potential to which capacitor C2 (or any other of the selected capacitors C1 to C5) can discharge and establishes the initial condition of ground, or essentially ground, potential at the non-grounded electrode of capacitor C2, as was hereinbefore noted to exist. Diode T10A serves as a second limiter, its cathode being connected, via conductor 302, to the cathode of diode T9A and to the upper electrode of capacitor C12, and its anode being connected to a positive potential determined by the values of resistor R89 and adjustable voltage divider P7. Diode T10A serves to reduce the effects of the impedance of the first limiter T9B, to make the size of the discharge-controlling capacitor C12 less critical, and to minimize the effects of amplitude variations of the negative pulse appearing at the anode of tube T8. The effects of the impedance of the first limiter T9B can be eliminated by a critical adjustment of voltage divider P7, which adjusts the effective operating potential of the second limiter T10A to a small positive potential.

As is depicted in Fig. 2, two banks of capacitors, C11 to C15 and C21 to C25, are provided additional to the bank of charging capacitors C1 to C5. The switches by means of which these several banks of capacitors are selectively placed in circuit are mechanically intercoupled. The values of capacitors C11 to C15 are proportionate to the values of capacitors C1 to C5, respectively. Since capacitors C1 to C5 are always charged to the same voltage regardless of the rate of charge or size of the charging capacitor, the selective inclusion of one of the capacitors C11 to C15 in the discharge path assists to maintain the total discharge period constant regardless of which of the capacitors C1 to C5 is utilized.

The bank of capacitors C21 to C25 is an element of a regenerative feedback circuit which, in conjunction with tubes T7A, T7B and T8, forms essentially a timed-pulse generator. It will be recalled that the output of pentode T8 is a function of the input of triode T6 and that the input of triode T6 is a function of the charge on capacitor C2. Therefore, the potential at the anode of tube T8 would normally rise in value as capacitor C2 discharged, thereby reducing the rate of discharge of that capacitor. This decrescence of the discharging rate at the anode of tube T8 is prevented by means of a regenerative feedback circuit. The output of amplifier T7A, in addition to being coupled to pentode T8 as hereinbefore described, is coupled to the grid of tube T7B by means of resistors R73 and R74. The anode of tube T7B is connected via conductor 303 to capacitor C22 (assumed to be the selected one of the bank of capacitors C21 to C25), switch S4, conductor 304, and to the grid of tube T7A. As a result of this feedback connection, tubes T7A and T7B act essentially as a trigger pair, causing the output voltage of pentode T8 to drop sharply and to remain at that reduced voltage for a time sufficient for capacitor C2 to discharge. Since the charged capacitor may be any one of the capacitors C1 to C5, however, this discharge time will vary. Therefore, the proper one of the bank of capacitors C21 to C25 is selected, in accordance with which one of the capacitors C1 to C5 is being utilized, to provide a time constant sufficiently long to permit discharge of the selected capacitor C1 to C5, but not so long as to interfere with the generation of the next succeeding pulse.

In this manner, the selected one of the capacitors C1 to C5 is linearly charged to a predetermined voltage and then abruptly discharged, both in a recurrent manner. Since the voltage at the non-grounded electrode of the selected one of the capacitors C1 to C5 is applied to the grid of triode T1, the output potential on conductor 203 will comprise a series of positive-going saw-tooth pulses of precisely controlled amplitude, shape and frequency.

*Pulse shaping circuit*

Figure 4:
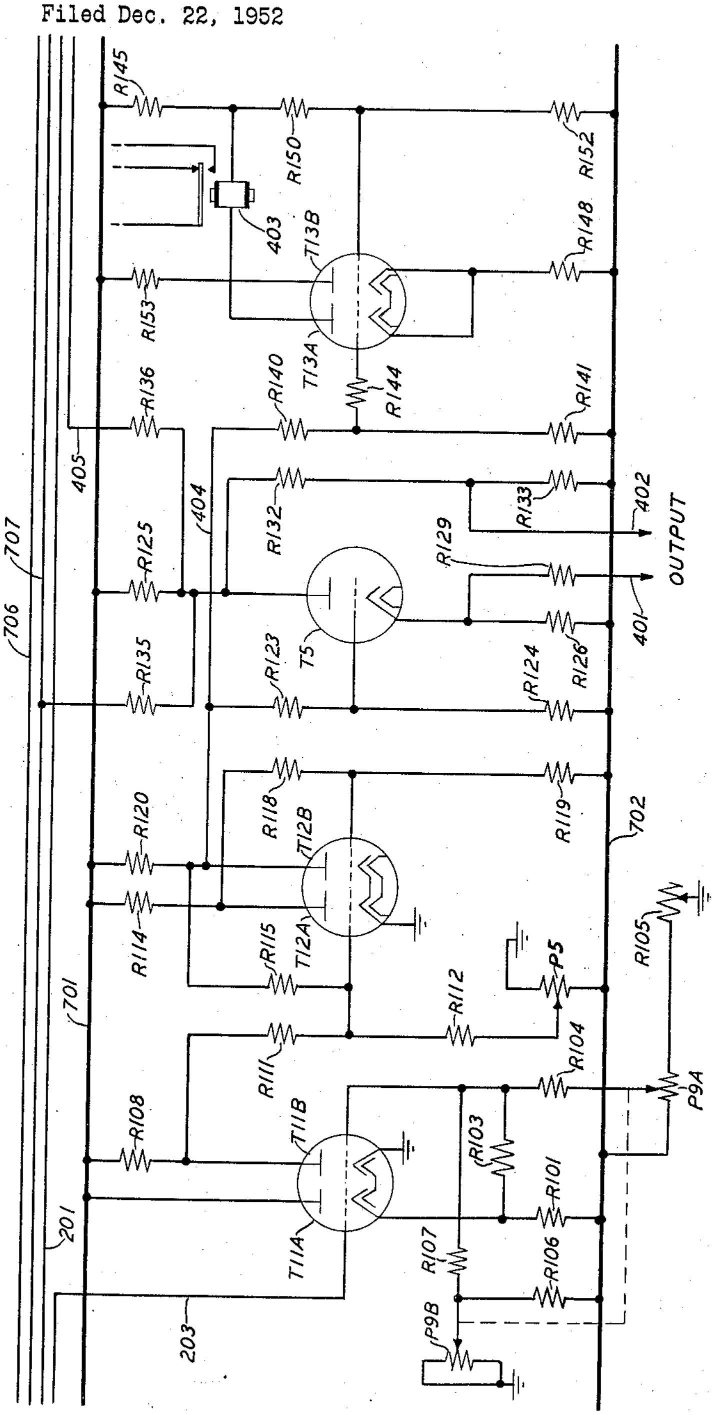
Fig. 4 shows the details of the square wave shaping circuits.

The output saw-tooth wave on conductor 203 may be converted to positive or negative square waves of controllable duration by means of the apparatus shown in Fig. 4 of the drawings.

The saw-tooth-wave voltage variations at the cathode of tube T1 are applied via conductor 203 to the grid of cathode follower T11A (Fig. 4). Since the cathode of triode T11A is connected to a source of negative potential via conductor 702 and resistor R101, the potential at the cathode of tube T11A will rise linearly in response to the linear increase of voltage at the grid of tube T11A. This rising potential is applied to the grid of amplifier T11B through resistor R103. Tube T11B is biased by grounding the cathode, and by applying a negative voltage to the grid thereof by means of resistors R104, R107, R106 and potentiometer P9A. It may be noted that a potentiometer P9B may be ganged to potentiometer P9A to correct for any slight nonlinearity of potentiometer P9A in a manner similar to that in which potentiometer P8B was ganged to potentiometer P8A, as was hereinbefore described.

Amplifier T11B can be adjusted by means of the aforesaid biasing circuit including potentiometer P9A so that the output potential at the anode thereof, due to the potential drop across resistor R108, will fall to a predetermined value at any desired point on the saw-tooth wave, i. e., the bias of tube T11B can be adjusted so that the voltage output thereof will drop to a predetermined level when the input to tube T11A has risen to a predetermined value. It will be noted that since the time base of the saw-tooth wave is linear, a uniformly graduated dial may be utilized with the bias-control potentiometer P9A. This dial may be graduated to read pulse length, in percentage of total cycle time. Variable resistor R105, the wiper of which is grounded, permits calibration of potentiometer P9A at the high end of its dial, and potentiometer P5, which, as will be seen, controls the bias on tube T12A, permits calibration of potentiometer P9A at the low end of its dial.

The anode of amplifier T11B is coupled to the grid of triode T12A via resistor R111. Tube T12A is biased so as normally to be conducting by means of circuits including resistors R108, R111, R120, R115, R112 and potentiometer P5. Tube T12A is coupled to tube T12B by means of resistor R118 and feedback resistor R115 is connected between the anode of tube T12B and the grid of tube T12A whereby those tubes function as a trigger circuit, tube T12B being normally biased below cut-off by means including resistors R114, R118 and R119. The grid bias of tube T12A is adjusted by means of voltage divider P5 so that the trigger action of tubes T12A and T12B occurs when the output of tube T11B reaches the aforesaid preselected potential. Therefore, when the output potential of tube T11B drops to the aforesaid preselected potential, the potential at the anode of tube T12B will drop sharply due to the potential drop across anode resistor 120.

This sharp drop in anode potential of tube T12B is applied to the grid of triode T5 by means of conductor 404 and resistors R123 and R124, and is applied to the grid of triode T13A by means of conductor 404 and resistors R140, R141 and R144.

Tube T5 is driven below cut-off by this negative signal, whereby its cathode potential becomes more negative and its anode potential becomes more positive, i. e., the potential applied to output conductor 401 through resistor R129 sharply drops and the potential applied to output conductor 402 by means of resistors R132 and R133 sharply rises. The rise in potential at the anode of tube T5 is applied via resistor R136 and conductor 405 to the train-counting circuits of Figs. 5 and 6 for a purpose hereinafter to be described.

Tube T13A is biased so as to be conducting at this time whereby relay 403, serially included in the anode circuit of tube T13A, is operated. When the sharp voltage drop occurs at the anode of tube T12B, tube T13A is driven below cut-off and relay 403 is released, controlling external load circuits accordingly. It may be noted that tube T13B is or may be provided to maintain a balance across the power conductor 701 and 702 and to prevent the unbalanced current to ground which would exist if tube T13A were a grounded-cathode triode and tube T13B were not provided. Tube T13A is coupled to tube T13B over an obvious circuit whereby when tube T13A is driven below cut-off, tube T13B will conduct, and when tube T13A is again rendered conductive, as will be hereinafter described, tube T13B will revert to a cut-off condition.

It will be recalled that the above operations transpired as a result of the rising voltage at the grid of tube T11A reaching a preselected point. As the voltage at that point continues to rise, i. e., for the duration of the rising front of the saw-tooth wave, the output at conductors 401 and 402 will remain constant (the horizontal portions of square waves) and relay 403 will remain released. However, when the selected capacitor C2 (Fig. 2) is discharged at the end of a cycle by the circuits of Fig. 3, the voltage at the grid of tube T11A sharply drops whereby the reverse of the above-described operations occur, with tube T5 being sharply driven above cut-off, sharply to render the potential on output conductor 401 less negative and sharply to render the potential on output conductors 402 and 405 less positive, and with tube T13A being driven above cut-off to reoperate relay 403.

While these operations have been described in the foregoing sequence for convenience of presentation, for clarity of understanding in the subsequent discussion, it should be recognized that the discharge of capacitor C2 and the consequent restoration of tube T5 to its conducting condition marks the beginning of an output square-wave pulse, and that the driving of tube T5 below cut-off, as the result of capacitor C2 having charged to a preselected voltage, actually marks the termination of the output square-wave pulse.

It will be seen that in response to one full saw-tooth wave, the circuits of Fig. 4 have generated a negative-going square-wave pulse (conductors 402 and 405) and a positive going squarewave pulse (conductor 401), and relay 403 has been operated and released. These operations recur in response to each succeeding saw-tooth pulse.

*Train counting circuit*

It will be recalled that the train of negative-going square-wave pulses produced at the anode of tube T5 (Fig. 4) was applied through resistor R136 to conductor 405. As the leading edge of each of these negative-going pulses is applied to capacitor C60 (Fig. 5), no effective change in potential occurs on conductor 504 because varistor V1 presents a very low impedance to ground to any potential lower than ground potential. However, at the trailing (positive-going) edge of each of these negative-going pulses, varistor V1 is ineffective to limit the potential on conductor 504 so that a sharp positive-going pulse is produced on conductor 504 by the differentiating action of capacitor C60 and resistor R339. This positive-going pulse is applied through capacitor C61 and through resistors R344 and R349 to the control grids of triodes T22A and T22B. Tubes T22A and T22B comprise a conventional form of trigger circuit, the anodes being connected to the positive potential on conductor 701 by load resistors R340 and R345, the cathodes being connected to the negative potential on conductor 702 by the network comprising resistor R338 and capacitor C64, each of the grids being connected to the negative potential on conductor 702 by resistor R350 and resistor R344 or R349, and the two tubes being cross-coupled by means of the networks comprising resistors R341 and R346 and capacitors C62 and C63.

As will be seen hereinafter, prior to counting, triode T22B is conducting and tube T22A is biased below cut-off. When the aforementioned positive-going pulse is applied to the control grids of this trigger pair, the state of the trigger circuit is changed so that triode T22A becomes conducting and triode T22B is driven below cut-off, whereupon the potential at the anode of tube T22B rises from a relatively low positive value to a relatively high positive value and the potential at the anode of tube T22A falls from a relatively high positive value to a relatively low positive value. The rise in potential at the anode of tube T22B is applied to resistor R330 for a purpose hereinafter to be noted.

The drop in potential at the anode of tube T22A is applied through resistor R334 and via conductor 505 to the second binary stage, which is represented in block schematic form in Fig. 5. This stage, and each of the succeeding stages, is substantially identical to the first binary stage above described, input conductors 505, 506 and 507 being connected to circuitry in the second, third and fourth binary stages, respectively, similar to the circuitry in the first binary stage to which input conductor 405 is connected, with the output circuits including resistors R326, R323 and R320 being connected to the anode of the right-hand triode in the respective stages in the same manner as resistor R330 is connected to the anode of tube T22B, and with the input circuits including resistors R335 and R336 of the third and fourth binary stages, respectively, being connected to the anodes of the left-hand triodes in the second and third binary stages, respectively, in the same manner as the input circuit including resistor R334 is connected to the anode of tube T22A.

The sharp fall in potential on conductor 505, resulting from tube T22A becoming conductive, will produce no change of state of the second binary stage due to the presence in the input circuit of that stage of a varistor similar to varistor V1.

At the trailing edge of the second pulse on conductor 405, the first binary stage trigger circuit will be reverted to its initial condition, resulting in a sharp rise in the potential applied via resistor R334 and conductor 505 to the second binary stage. This sharp rise in potential on conductor 505 results in a sharp positive-going pulse being applied to the control grids of the triodes comprising the second binary stage trigger circuit, whereupon the right-hand triode in this stage will be driven below cut-off, causing a higher positive potential to be applied to resistor R326, and whereupon the left-hand triode in this stage will become conductive, causing the potential applied via resistor R335 and conductor 506 to the third binary stage sharply to fall in value. This reduction in potential on conductor 506 will produce no change in the state of the third binary stage.

The functioning of the several binary stages in response to the successive pulses on conductor 405 is depicted in Table I in which "*h*" represents that a high positive output potential is applied to output resistors R330, R326, R323 or R320 (i. e., that the right-hand triode of the binary stage is non-conducting) and in which "*l*" represents that a low positive output potential is applied to output resistors R330, R326, R323 or R320 (i. e., that the right-hand triode of that binary stage is conducting).

TABLE I

| Pulse | 1st Binary Stage | 2nd Binary Stage | 3rd Binary Stage | 4th Binary Stage |
|---|---|---|---|---|
| 0 | *l* | *l* | *l* | *l* |
| 1 | *h* | *l* | *l* | *l* |
| 2 | *l* | *h* | *l* | *l* |
| 3 | *h* | *h* | *l* | *l* |
| 4 | *l* | *l* | *h* | *l* |
| 5 | *h* | *l* | *h* | *l* |
| 6 | *l* | *h* | *h* | *l* |
| 7 | *h* | *h* | *h* | *l* |
| 8 | *l* | *l* | *l* | *h* |
| 9 | *h* | *l* | *l* | *h* |
| 10 | *l* | *h* | *l* | *h* |
| 11 | *h* | *h* | *l* | *h* |
| 12 | *l* | *l* | *h* | *h* |
| 13 | *h* | *l* | *h* | *h* |
| 14 | *l* | *h* | *h* | *h* |
| 15 | *h* | *h* | *h* | *h* |
| Reset | *l* | *l* | *l* | *l* |

The outputs of the binary stages are "summed" primarily by means of resistors R330, R326, R323, R320, and R319, switch SW3 and the network of resistors connected to the stationary contacts of switch SW3. The plurality of resistors involved in this summing operation are so selected and arranged that the potential on output conductor 510 will reach a critical preselected value when the pulses received via conductor 405 are equal in number to the setting of switch SW3. Thus resistors R300 to R308, serially connected between ground and the source of negative potential on conductor 702, constitute a voltage divider. Resistor R310 is connected to ground, resistor R317 is connected to conductor 702 and the intermediate resistors R311 to R316 are connected between adjacent ones of the successive voltage-divider resistors R300 to R308. Resistors R310 to R317 are provided to compensate for changes in the impedance of the aforesaid voltage divider. The values of resistors R320, R323, R326 and R330 are approximately in the proportion 1:2:4:8, relative to each other. With the paralleled resistors R320, R323, R326 and R330 being selectively connected to one of the resistors R310 to R317 by means of switch SW3, the output voltage on conductor 510 will be controlled by both the setting of switch SW3 and the state of the several binary stages. The voltage on conductor 510 will rise incrementally to a preselected critical value whenever the binary stages assume a predetermined combinational state, and with properly selected parameters the binary stages will assume this combinational state when a number of input pulses have been received via conductor 405 equal to the setting of switch SW3. For example, if switch SW3 is set to its No. 3 position, as shown, the potential on output conductor 510 will reach the aforesaid preselected critical potential only when the first and second binary stages are conducting on their left-hand section, so that a relatively high potential is applied to resistors R330 and R326 and when all the other binary stages are conducting on their right-hand sections so that relatively low positive potentials are applied to resistors R323 and R320. As may be seen by reference to Table I, supra, this combinational condition of the several binary stages will exist after the third incoming pulse has been received via conductor 405.

The rising potential on conductor 510 is applied to the control grid of triode T26A, the cathode of which is connected to the source of positive potential on conductor 701 by means of resistor R401 and to ground through resistor R402 with its bypass capacitor C70. It will now be appreciated that the initial potential at the grid of triode T26A is selectively established, at the instant of commencement of counting, by means of switch SW3, tube T26A being biased most negatively when switch SW3 is set in its No. 10 position and least negatively (but still below cut-off) when switch SW3 is set in its No. 1 position. As the potential on conductor 510 rises incrementally due to the operation of the binary counter, a critical potential will be reached at which tube T26A will become conductive. The resultant reduction in anode potential of tube T26A will be applied to the voltage divider comprising resistors R361 and R363 whereby a reduction in potential is effected at the control grid of tube T27A. Tubes T27A and T27B are so intercoupled as to form a trigger circuit with tube T27A normally being conductive and tube T27B normally being biased below cut-off. At the reduction in grid potential of tube T27A, the trigger circuit comprising tubes T27A and T27B will be triggered to its non-normal stable state wherein tube T27B is conducting and tube T27A is biased below cut-off.

As a result of the increased potential drop across load resistor R374, a reduced potential will be applied through resistors R399 and R398 to ground whereby a reduced potential will be applied through resistor R400 to the grid of tube T26A. This feedback voltage serves to bias tube T26A well below cut-off to prevent any possibility of inaccurate operation, particularly on the lower counts. Thus, if switch SW3 be set at its No. 1 position, tube T26A is theoretically biased but a small amount below cut-off and if the parameters of the circuit should change slightly such as by aging, this bias might change so that tube T26A would not be fully blocked. If tube T26A were not fully blocked, an improper bias might be applied to tube T27A creating, as will be apparent from the ensuing description, an inaccurate delay interval between pulse trains. The described feedback path obviates this possibility of misfunctioning.

The reduction in potential at the anode of tube T27B is also applied via conductor 605 and through resistors R331 and R332 to the negative potential on conductor 702 whereby a reduced potential is applied through individual resistors, such as resistor R342, to the control grids of the left-hand triodes, such as triode T22A, of the several binary stages. Additionally, the sharp rise in potential at the anode of tube T27A is applied via conductor 606 and through individual resistors, such as resistor R347, to the control grids of the right-hand triodes, such as triode T22B, of the several binary stages. Consequently, the right-hand triode of each of the binary stages is forced to become conductive and the left-hand triode of each of the binary stages is driven well below cut-off so that all of the binary stages are reset to "normal," i. e. to the condition represented in the last line of Table I, which is also the "zero pulse" condition represented in the first line of Table I.

The sharp reduction in potential at the anode of tube T27B is also applied through resistor R359 to the cathode of the diode-connected triode T30A. A potential is normally applied to the cathode of tube T30A, by means including resistor R358, resistor R359 and resistor R356, to maintain that tube in a blocked condition despite the rising potential which is periodically applied to the anode of tube T30A by the selected one of the capacitors C1 to C5 (Fig. 2) via conductor 201. However, at the aforesaid sharp reduction in the cathode potential of tube T30A, tube T30A will conduct as, preferably, the selected one of the capacitors C1 to C5 approaches its maximum potential. In this manner, tube T30A limits the maximum potential on conductor 201 to a value below that at which tube T1 (Fig. 2) will be effective to operate the circuits of Fig. 3. Consequently, tube T30A stops the operation of the saw-tooth wave generator of Figs. 1 and 2, which terminates the functioning of the square-wave generator of Fig. 4, which results in a termination of the output pulses on conductors 401 and 402, of the functioning of relay 403, and of the input pulses via conductor 405 to the binary counter of Fig. 5.

The reduction in potential at the anode of tube T27B is also applied through resistors R377 and R373 to the negative potential on conductor 702 whereby a reduced potential is applied to the grid of tube T28A which results in an increased potential being applied via the voltage divider comprising resistors R381 and R382 to the cathode of diode T29A.

Prior to this increase in cathode potential of diode T29A, that diode served to limit the potential on conductor 607 to a value sufficiently low to disable the linear time base interval-determining circuits hereinafter to be described. However, at the sharp increase in cathode potential of tube T29A, tube T29A no longer effectively limits the potential on conductor 607. As a result, the selected one of the capacitors C67 to C69 can charge over a path from the positive potential at the wiper of potentiometer P19, connected to the anode of tube T30B, conductor 609, wiper of switch SW4, through the selected one of the resistors R393 to R395, resistor R392, wiper of switch SW5, which is mechanically linked to the wiper of switch SW4, and through the selected one of the capacitors C67 to C69 to ground. As a result, a rising potential is applied via conductor 607, connected to the wiper of switch SW5, to the control grid of triode T28B. As a consequence, the cathode of tube T28B, which is connected through resistor R396 to the negative potential on conductor 702, rises in potential accordingly.

This rise in cathode potential of tube T28B is applied to the cathode of the tube T30B. Since the grid of tube T30B is held at a fixed potential (except for some negative feedback through resistor R386) with respect to the anode of tube T30B, as the cathode potential of tube T30B rises the potential at the anode of that tube will rise accordingly, so that the potential at the brush of potential P19 will likewise increase in value thereby increasing the charging voltage for the selected one of the capacitors C67 to C69. The parameters of this regenerative feedback path are so selected that the potential at the brush of potentiometer P19 rises with the potential at the grid of tube T28B in approximately a one-to-one relationship. As a result, the selected one of the capacitors C67 to C69 changes linearly.

The linear rise in potential at the cathode of tube T28B is applied through resistor R351 to the grid of triode T26B, which is biased by means hereinafter to be described. As a result of the linearly increasing grid potential of tube T26B, a decreasing potential will be applied from the anode of that tube through resistor R371 to the control grid of tube T27B. Since tube T26A has been blocked by virtue of the potential applied to the grid thereof over the previously described feedback path from the anode of tube T27B, a relatively high potential is being applied to the control grid of tube T27A. Consequently, when the potential applied to the control grid of tube T27B falls to a sufficiently low value, the circuit comprising tubes T27A and T27B will be triggered back to its normal condition. The parameters of the circuit are preferably so selected that tube T26A must be blocked and tube T26B must be conducting to a substantial degree before tubes T27A and T27B can be triggered back to normal. When tube T27B is again rendered non-conductive, the resultant rise in its anode potential is inverted by tube T28A and applied to diode T29A to restore the cathode of tube T29A to its original potential. As a result of this reduction in cathode potential of tube T29A, the selected one of the capacitors C67 to C69 will discharge through tube T29A, with tube T29B, having its anode grounded through resistor R383, serving as a limiter so as accurately to fix the initial potential of the selected one of the capacitors C67 to C69. As a consequence of this discharge, tubes T30B, T28B and T26B are also restored to their initial condition.

The rise in anode potential of tube T27B, upon restoral of the trigger circuit, also disables tube T30A so that tube T30A is no longer effective to limit the potential to which the selected one of the capacitors C1 to C5 (Fig. 2) can rise, thereby starting the operation of the saw-tooth and square-wave generator of Figs. 2 to 4.

The cutting off of conduction in tube T27B also serves to remove the blocking bias applied through resistors R399 and R400 to the grid of tube T26A thereby again enabling that tube to perform its normal function. Additionally, when the trigger circuit comprising tubes T27A and T27B is reverted to normal the potentials applied via conductors 605 and 606 to the binary stages are raised and reduced, respectively, to their original values whereby the binary stages are enabled to respond to a further series of input pulses on conductor 405.

It will, therefore, be seen that a train of pulses is generated by the saw-tooth-wave and square-wave generators of Figs. 2 to 4, that after a number of those pulses determined by the setting of switch SW3 the pulses are terminated by disabling those generators, and that after a preselected interval the generators are again enabled to transmit another such train of output pulses.

The inter-train delay interval is selected grossly by means of switches SW4 and SW5 and finely by potentiometer P17 (Fig. 6). The values of resistance and capacitance in the aforementioned delay charging circuit may be selected by means of mechanically ganged switches SW4 and SW5. The values of resistor R392, resistors R393 to R395 and capacitors C67 to C69 are so selected as to give, for example, a 100-, 500- or 2000-millisecond delay between pulse trains. A fine adjustment of this time may be obtained by adjusting potentiometer P17, which varies the bias on tube T26B through resistor R352. Variable resistor R355, the wiper of which is grounded, is employed to permit calibration of potentiometer P17 at the low end of the dial associated with potentiometer P17, and potentiometer P19, which determines, in part, the charging voltage for capacitor C67, C68 or C69, is employed to permit calibration of potentiometer P17 at the high end of the dial associated with potentiometer P17.

*Power supply circuit*

Figure 7:
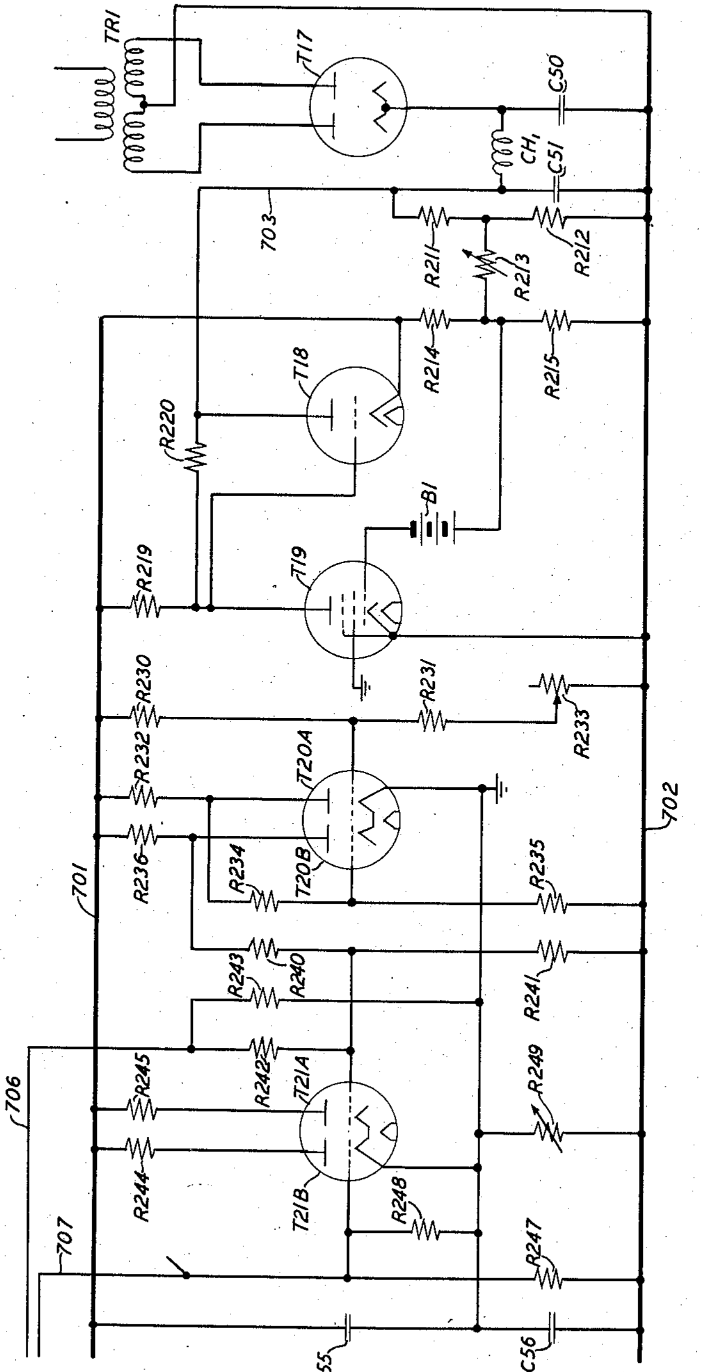
Fig. 7 shows an exemplary power supply circuit.
Figure 8:
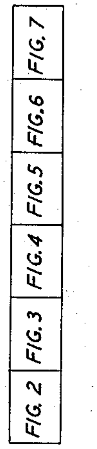
Fig. 8 shows the manner in which Figs. 2 to 7 of the drawings should be oriented relative one to the other.

The power supply circuit of Fig. 7 supplies and maintains a proper positive voltage on conductor 701 and a proper negative voltage on conductor 702. Tubes T17, T18 and T19, and the associated circuits, serve to supply a rectified, filtered and regulated voltage to conductors 701 and 702, and tubes T19 to T21B, and their associated circuits, serve to maintain a proper ratio between the voltage on conductors 701 and 702.

The full-wave rectifier tube T17 converts the alternating voltage from the power transformer TR1 into pulsating direct current which is applied through a capacitor-input type filter comprising capacitors C50 and C51 and choke CH1. The output voltage from the filter, as it appears on conductors 702 and 703, is applied across the voltage regulator tube T18 and, in series therewith, resistors R214 and R215. The cathode of tube T18 is connected to output conductor 701 so that tube T18 serves as a series regulator.

Tube T18 is controlled by summing amplifier T19, the voltage at the anode of pentode T19 being applied to the grid of triode T18 so that a rise or fall in the potential at the anode of tube T19 will produce a compensatory rise or fall in the voltage on conductor 701, which is connected to the cathode of tube T18. The voltage at the anode of tube T19 is controlled by the voltage at its grid and its control grid is connected, in series with reference battery B1, to a point intermediate resistor R214 and resistor R215 and, additionally, through variable resistor R213 to a point intermediate resistors R211 and R212, which are bridged across the filter output conductors 702 and 703. The voltage applied to the control grid of tube T19 by battery B1 and by resistors R214 and R215, which are bridged across conductors 701 and 702, produces a voltage at the anode of tube T19, and therefore at the grid of tube T18, which tends to produce a constant voltage across the output conductors 701 and 702. The voltage at the control grid of tube T19 is also affected, however, by the potential existing across the bridge comprising resistors R211 and R212, i. e., by the filter-output voltage. The extent of this effect, relative to the effect of the bridge comprising resistors R214 and R215, is controlled by variable resistor R213. This further input voltage to tube T19 provides input voltage compensation which tends to readjust the regulation as required by input-voltage variations.

The voltage-ratio regulator, comprising tubes T20A, T20B, T21A and T21B and associated circuits, maintains the required division of the total supply voltage into its proper positive and negative values. The normal unbalance of the positive and negative currents is reduced to a low value by connecting an artificial load, comprising variable resistor R249, between the negative supply conductor 702 and ground. The variations in unbalance of the positive and negative currents are then compensated for by shunt regulator tubes T21A and T21B.

A resistance bridge comprising resistors R230 and R231 and variable resistor R233 is connected across the supply conductors 701 and 702. The voltage at a point intermediate resistors R230 and R231 is applied to the control grid of tube T20A, amplified and inverted, applied to the control grid of amplifier T20B, again amplified and reinverted and applied to the control grid of shunt regulator T21A which is connected, in series with resistor R245, between ground and conductor 701. Therefore, any change in the ratio between the positive and negative voltages on conductors 701 nd 702 will be amplified by the two-stage amplifier comprising tubes T20A and T20B and applied to tube T21A to cause an appropriate and compensating current drain through tube T21A thereby tending to maintain a constant voltage ratio between conductors 701 and 702.

In order to obtain better regulation, the variations in voltage ratio are further reduced by other compensating inputs to both tubes T21A and T21B, the latter of which is also connected, in series with resistor R244, between ground and supply conductor 701. Thus, for example, conductor 706, which is connected through variable resistor R242 to the control grid of regulator tube T21A, extends to the linear time base circuit of Fig. 2, being connected both through resistor R63 to the cathode of tube T3 and through resistors R27 and R19 to the anode of tube T2A. Similarly, conductors 707, which is connected to the grid of regulator tube T21B, extends through resistor R85 to the anode of tube T8 in the discharge and limiting circuits of Fig. 3 and through resistor R135 to the anode of tube T5 in the pulse-shaping circuit of Fig. 4. These input voltages result in current variations in regulator tubes T21A and T21B approximately equal in amount but opposite in phase to the variations in the circuits being supplied.

By virtue of these arrangements, the circuits of Figs. 2 to 6 are supplied with substantially constant, closely regulated voltages.

It is to be understood that the above-described arrangements are but illustrative of the application of the principles of the invention. Numerous other arrangements may be devised by those skilled in the art without departing from the spirit and scope of the invention.

What is claimed is:

1. In a pulse generator, a capacitor, a charging circuit for said capacitor including a resistor, and means for maintaining a constant voltage across said resistor while said capacitor is charging comprising first and second serially-connected amplifying means connected across said resistor, means for applying a degenerative feedback voltage to said first amplifying means, and means for applying a degenerative feedback voltage to said second amplifying means.

2. In a pulse generator, a capacitor, a charging circuit for said capacitor including a resistor, and means for maintaining a constant voltage across said resistor while said capacitor is charging comprising an amplifier, a diode connecting said amplifier to said resistor, and a degenerative feedback path for said amplifier, said path including said diode and excluding said capacitor.

3. In a pulse generator, a capacitor, a charging circuit for said capacitor including a resistor, and means for maintaining a constant voltage across said resistor while said capacitor is charging comprising first and second serially-connected amplifying means, a diode connecting said second amplifying means to said resistor, a degenerative feedback path for said second amplifying means including said diode, and means for applying a degenerative feedback voltage to said first amplifying means.

4. In a pulse generator, a capacitor, a charging circuit for said capacitor including a resistor, and means for maintaining a constant voltage across said resistor while said capacitor is charging comprising first and second serially-connected amplifying means, a diode connecting the second amplifying means to said resistor, a degenerative feedback path for said second amplifying means including said diode, means for applying a degenerative feedback voltage to said first amplifying means, and means for selectively biasing said second amplifying means.

5. In a pulse generator, a capacitor, a charging circuit for said capacitor including a resistor, and means for maintaining a constant voltage across said resistor while said capacitor is charging comprising amplifying means connected across said resistor, and biasing means for applying a selectable bias to said amplifying means, said biasing means comprising a first potentiometer connected across a source of potential, a second potentiometer mechanically ganged to said first potentiometer, and circuit means connecting the movable elements of said potentiometer to said amplifying means.

6. In a pulse generator, a capacitor, a charging circuit for said capacitor including a resistor, and means for maintaining a constant voltage across said resistor while said capacitor is charging comprising amplifying means connected across said resistor, and biasing means for applying a selectable bias to said amplifying means, said biasing means comprising a first potentiometer connected across a source of potential, a second potentiometer mechanically ganged to said first potentiometer and having both of the terminals of the resistive element thereof connected to a second source of potential, and circuit means connecting the movable elements of said potentiometers to said amplifying means.

7. In a pulse generator, a capacitor, a charging circuit for said capacitor including a resistor, and means for maintaining a constant voltage across said resistor while said capacitor is charging comprising amplifying means connected across said resistor, and biasing means for applying a selectable bias to said amplifying means, said biasing means comprising a first potentiometer connected across a source of potential, a second potentiometer mechanically ganged to said first potentiometer, a pair of resistors interconnecting the movable elements of said potentiometers, and a connection between a point intermediate said two resistors and said amplifying means.

8. In a pulse generator, a capacitor, a charging circuit for said capacitor including a resistor, and means for maintaining a constant voltage across said resistor while said capacitor is charging comprising amplifying means connected across said resistor, and biasing means for applying a selectable bias to said amplifying means, said biasing means comprising a first potentiometer connected across a source of potential, a second potentiometer mechanically ganged to said first potentiometer, a second resistor connected to another source of potential, and circuit means connecting the movable elements of said potentiometers to said amplifying means and to said second resistor.

9. In a pulse generator, a capacitor, a charging circuit for said capacitor including a resistor, and means for maintaining a constant voltage across said resistor while said capacitor is charging comprising amplifying means connected across said resistor, and biasing means for applying a selectable bias to said amplifying means, said biasing means comprising a first potentiometer connected across a source of potential, a second potentiometer mechanically ganged to said first potentiometer, a pair of resistors interconnecting the movable elements of said potentiometers, a connection between a point intermediate said pair of resistors and said amplifying means, and a resistor connected to another source of potential and to a point intermediate one of said pair of resistors and the movable element of said second potentiometer.

10. In a pulse generator, a capacitor, a charging circuit for said capacitor including a resistor, and means for maintaining a constant voltage across said resistor while said capacitor is charging comprising amplifying means connected across said resistor, and biasing means for applying a selectable bias to said amplifying means, said biasing means comprising a first potentiometer connected across a source of potential and having both of the terminals of the resistive element thereof connected to a second source of potential, a second potentiometer mechanically ganged to said first potentiometer, a pair of resistors interconnecting the movable elements of said potentiometers, a connection between a point intermediate said pair of resistors and said amplifying means, and a resistor connected to another source of potential and to a point intermediate one of said pair of resistors and the movable element of said second potentiometer.

11. In a pulse generator, a capacitor, a charging circuit for said capacitor including a resistor, a normally non-conducting unidirectional current conducting device connected to said capacitor, means connected to and controlled by said capacitor for rendering said device conductive, and means including said device for discharging said capacitor.

12. In a pulse generator, a first capacitor, a charging circuit for said first capacitor including a resistor, a unidirectional current conducting device connected to said first capacitor, first means including a second capacitor connected to said device for rendering said device non-conductive, means connected to and controlled by said first capacitor for rendering said device conductive, and means including said device and said second capacitor for discharging said first capacitor.

13. In a pulse generator, a capacitor, a charging circuit for said capacitor including a resistor, a normally non-conducting unidirectional current conducting device connected to said capacitor, means connected to and controlled by said capacitor for rendering said device conductive, means including said device for discharging said capacitor, and means for limiting the potential to which said capacitor can discharge.

14. In a pulse generator, a capacitor, a charging circuit for said capacitor including a resistor, a normally non-conducting unidirectional current conducting device connected to said capacitor, means connected to and controlled by said capacitor for rendering said device conductive, means including said device for discharging said capacitor, and means for limiting the potential to which said capacitor can discharge comprising a second unidirectional current conducting device having one electrode connected to a source of potential and the other electrode connected to said first device and to said capacitor.

15. In a pulse generator, a first capacitor, a charging circuit for said first capacitor including a resistor, a first unidirectional current conducting device connected to said first capacitor, means including a second capacitor connected to said first device for rendering said first device non-conductive, means connected to and controlled by said first capacitor for rendering said first device conductive, means including said first device and said second capacitor for discharging said first capacitor, and a second unidirectional current conducting device having one electrode connected to a source of potential and the other electrode connected to said first device and to said second capacitor.

16. In a pulse generator, a first capacitor, a charging circuit for said first capacitor including a resistor, a first unidirectional current conducting device connected to said first capacitor, means including a second capacitor connected to said first device for rendering said first device non-conductive, means connected to and controlled by said first capacitor for rendering said first device conductive, means including said first device and said second capacitor for discharging said first capacitor, a second unidirectional current conducting device having one electrode connected to a source of potential and the other electrode connected to said first device and to said second capacitor, and a third unidirectional current conducting device having one electrode connected to a source of potential and the other electrode connected to said first device and to said second capacitor.

17. In a pulse generator, a capacitor, a charging circuit for said capacitor including a resistor, a normally non-conducting unidirectional current conducting device connected to said capacitor, means connected to and controlled by said capacitor for rendering said device conductive for a selectable period, means for controlling the period during which said device is conducting, and means including said device for discharging said capacitor.

18. In a pulse generator, a capacitor, a charging circuit for said capacitor including a resistor, a normally non-conducting unidirectional current conducting device connected to said capacitor, means including amplifying means connected to and controlled by said capacitor for rendering said device conducting for a selectable period, means comprising a regenerative feedback circuit for said amplifying means having a selectable time constant for controlling the period during which said device is conducting, and means including said device for discharging said capacitor.

19. In a pulse generator, a first capacitor, a charging circuit for said first capacitor including a resistor, a normally non-conducting unidirectional current conducting device connected to said first capacitor, means including amplifying means connected to and controlled by said first capacitor for rendering said device conducting for a selected period, means including an electron discharge device and a capacitor connected to said amplifying means for controlling the period during which said unidirectional current conducting device is conducting, and means including said unidirectional current conducting device for discharging said first capacitor.

20. In a pulse generator, a capacitor, means for alternately charging and discharging said capacitor to produce a series of pulses, means for counting said pulses, circuit means for discharging said capacitor, and means including said counting means for operating said circuit means after a preselected number of said pulses have been counted.

21. In a pulse generator, a capacitor, means for alternately charging and discharging said capacitor to produce a series of pulses, means for counting said pulses, circuit means for discharging said capacitor, means including said counting means for operating said circuit means after a preselected number of said pulses have been counted, and means for again enabling said pulse source after a preselected interval of time.

22. In a pulse generator, a capacitor, means for alternately charging and discharging said capacitor to produce a series of pulses, means for counting said pulses, circuit means for discharging said capacitor, means including said counting means for operating said circuit means after a preselected number of said pulses have been counted, and means including said circuit means for resetting said counting means.

23. In a pulse generator, a pulse source, means connected to said pulse source for counting pulses transmitted from said source, a trigger circuit, means including said counting means for operating said trigger circuit after a preselected number of pulses have been counted, means including said trigger circuit for disabling said pulse source, means for resetting said trigger circuit, and means for delaying the resetting of said trigger circuit for a predetermined interval of time.

24. In a pulse generator, a pulse source, means connected to said pulse source for counting pulses transmitted from said source, a trigger circuit, means including said counting means for operating said trigger circuit after a preselected number of pulses have been counted, means including said trigger circuit for disabling said pulse source, means including said trigger circuit for resetting said counting means, means for resetting said trigger circuit, and means for delaying the resetting of said trigger circuit for a predetermined interval of time.

References Cited in the file of this patent

UNITED STATES PATENTS

| | | |
|---|---|---|
| 2,462,024 | Johnson | Feb. 15, 1949 |
| 2,521,789 | Grosdoff | Sept. 12, 1950 |
| 2,539,623 | Heising | Jan. 30, 1951 |
| 2,588,427 | Stringfield | Mar. 11, 1952 |
| 2,690,507 | Woods-Hill et al. | Sept. 28, 1954 |
| 2,701,306 | Bess | Feb. 1, 1955 |